United States Patent [19]

Tanaka

[11] 4,271,404
[45] Jun. 2, 1981

[54] POWER SUPPLY CONTROLLER IN A KEYBOARD-EQUIPPED APPARATUS SUCH AS AN ELECTRONIC CALCULATOR

[75] Inventor: Shinichi Tanaka, Nara, Japan

[73] Assignee: Sharp Kabushiki Kaisha, Osaka, Japan

[21] Appl. No.: 888,865

[22] Filed: Mar. 22, 1978

[30] Foreign Application Priority Data

Mar. 29, 1977 [JP] Japan .................................. 52/35657

[51] Int. Cl.³ .......................... G06F 3/02; G06F 1/00
[52] U.S. Cl. .......................... 340/365 S; 340/365 R; 364/707
[58] Field of Search ........................ 340/365 R, 365 S; 364/707; 178/17 C; 179/90 K; 400/479; 307/269, 293, 208

[56] References Cited

U.S. PATENT DOCUMENTS

| | | | |
|---|---|---|---|
| 3,641,328 | 2/1972 | Osborne | 364/707 |
| 3,946,216 | 3/1976 | Dierendonck | 364/707 |
| 3,955,185 | 5/1976 | Nishimura | 364/707 |
| 4,144,580 | 3/1979 | Seki et al. | 340/365 R |
| 4,158,285 | 6/1979 | Heinsen et al. | 340/365 S |
| 4,164,666 | 8/1979 | Hirasawa | 340/365 R |

OTHER PUBLICATIONS

IBM Technical Disclosure Bulletin, "Battery Powered Data Entry Unit", Foster, pp. 3437-3438, Apr. 1973.

Primary Examiner—James J. Groody
Attorney, Agent, or Firm—Birch, Stewart, Kolasch & Birch

[57] ABSTRACT

In a keyboard-equipped apparatus such as an electronic calculator, a plurality of gate circuits are provided which are enabled and disabled by key strobe signals and a common power supply control signal. The power supply control signal serves to initiate power supply from a power source to a central processing unit (CPU) and a display. The key strobe signals are developed from the CPU, with the respective levels being indefinite depending on or definite whether the central processing unit is appropriately powered. The power supply control signal is generated from a power controller. The actuation of a specified key included within a keyboard unit enables the power supply to the CPU and so on. The function of a conventional mechanical power switch may be eliminated because of the electronically controlled power supply control circuit.

5 Claims, 1 Drawing Figure

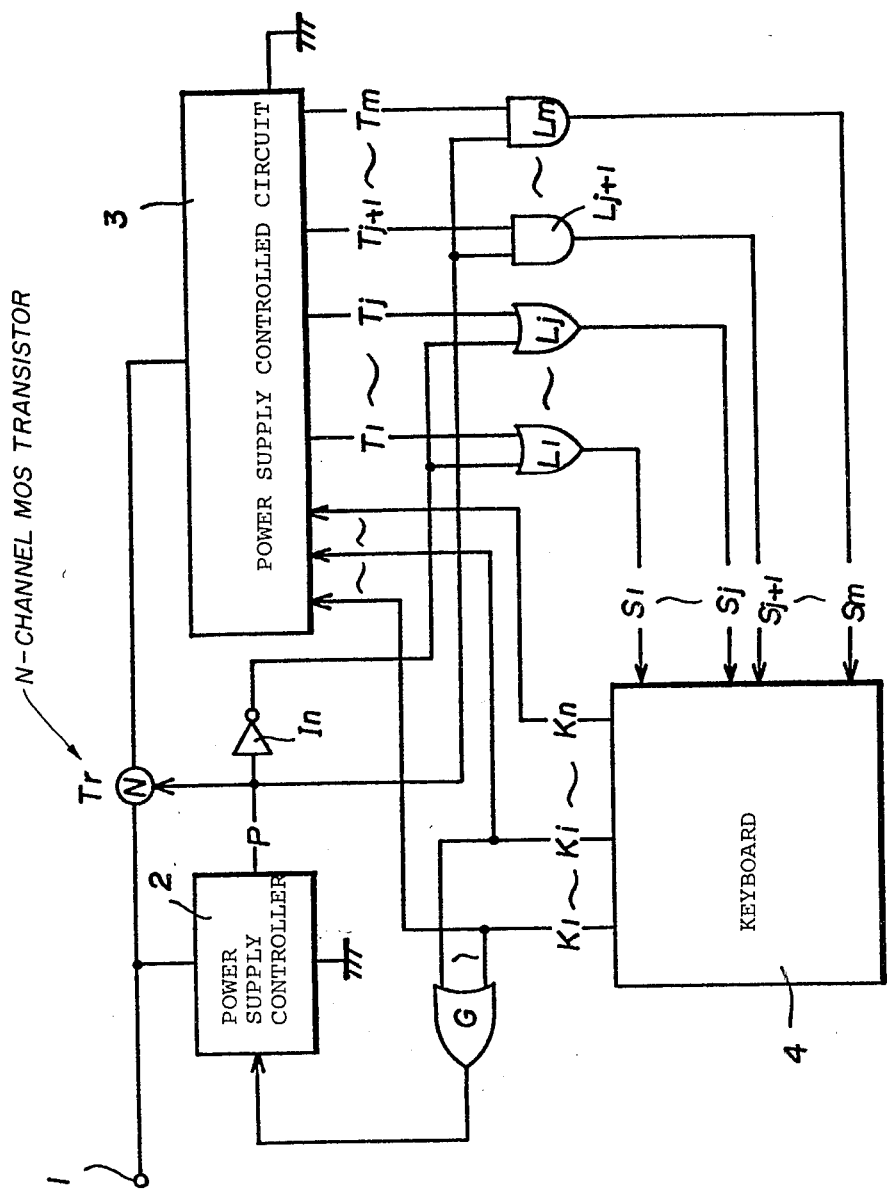

POWER SUPPLY CONTROLLER IN A KEYBOARD-EQUIPPED APPARATUS SUCH AS AN ELECTRONIC CALCULATOR

BACKGROUND OF THE INVENTION

The present invention relates to an electronically controlled power supply controller for use in an electronic calculator and so on and, more particularly, to a power supply controller useful with a keyboard of the key strobing type.

A prior power supply controller for an electronic calculator is disclosed in U.S. Pat. No. 3,755,806, "CALCULATOR DISPLAY CIRCUIT" patented on Aug. 28, 1973, wherein a display circuit for use in an electronic calculator which includes a computing circuit for receiving and manipulating digital data includes means for automatically turning "off" or "blanking" the display device for the electronic calculator after a predetermined period of time between data entries. The above U.S. Patent discloses a blanking means for automatically extinguishing the display device of said electronic calculator after the lapse of a predetermined period of time.

However, power supply to the computing circuit is not controlled in the above mentioned power supply controller. It is further preferable to control the power supply for the computing circuit because the computing circuit comprising an IC consumes more power than the display device which is made of liquid crystal materials.

OBJECTS AND SUMMARY OF THE INVENTION

Accordingly, it is a broad object of the present invention to provide an improved power supply controller for an electronic apparatus.

It is a more specific object of the present invention to provide an improved power supply controller being controlled by a gate circuit for selecting a key strobe signal in response to the actuation of a predetermined key within a keyboard rather than a mechanical power switch.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a plurality of gate circuits are provided which are responsive to both a power supply control signal and key strobe signals to initiate power supply from a power source to power a variety of circuit means, for example, a central processing unit (CPU) and a display such as a liquid crystal display and so on. The key strobe signals are generated from the CPU in a well known manner and the power control signal is developed from a power supply control circuit. The power supply is initiated upon the actuation of a specified key which is connected to the power supply control circuit so as to generate the power supply control signal. Simultaneously, numeral or command information relevant to the actuated key or keys is introduced into the CPU for manipulation purposes. The gate circuits comprise OR gate circuits and AND gate circuits. The OR gate circuits receive an inverted phase power supply control signal and the AND gate circuits receive the power control signal with the non-inverted phase in addition to the key strobe signals. A conventional mechanical power switch can be eliminated because of the above power supply control system.

BRIEF DESCRIPTION OF THE DRAWING

Other objects and novel features of the present invention are set forth in the appended claims and the present invention as to its organization and its mode of operation will best be understood from a consideration of the following detailed description of the preferred embodiments taken in connection with the accompanying drawings, wherein:

A single drawing is a circuit diagram of a power supply controller according to the present invention.

DETAILED DESCRIPTION OF THE PREFERRED EMBODIMENTS

The drawing shows a power supply controller of the present invention, wherein the numeral 1 refers to one terminal of a power source for transmitting power energy together with the other terminal (not shown) which is grounded. The numeral 2 denotes a power supply controller commprising a flip-flop circuit. The numeral 3 is a power supply controlled circuit including a central processing unit (CPU) and a display such as a liquid crystal display and so on. The numeral 4 refers to a keyboard. The power supply controller 2 is assumed to be operated by a negative voltage derived from the power source throughout the detailed description described below. A conventional mechanical power switch can be eliminated because of the function of the power supply controller for reasons which become fully apparent hereinafter.

An N-channel MOS transistor Tr is coupled to the terminal 1 and the power supply controlled circuit 3, the N-channel MOS transistor Tr being controlled by the power supply control signal P to implement the supply of power to circuit 3.

The N-channel MOS transistor Tr connects electric power from the power source to the power supply controlled circuit 3 in the ON state thereof. A plurality of both OR gate circuits L1 through Lj and AND gate circuits Lj+1 through Lm are provided for respectively conducting key strobe signals T1 through Tj and Tj+1 through Tm which are generated from the power supply controlled circuit 3. The OR gate circuits L1 through Lj also receive power supply control signal P, signal P being inverted by an inverter In. The AND gate circuits Lj+1 through Lm receive power supply controller signal P. An OR gate circuit G is connected to receive a plurality of key output signals K1 through Ki and produces an output signal which is applied to the power supply controller 2. The OR gate circuits L1 through Lj, the AND gate circuits Lj+i through Lm, the inverter In, and the OR gate circuit G are all connected to the terminal 1 to continuously receive power energy from the power source although it is not shown in the drawing.

In the aforementioned circuit configurations, the switching MOS transistor Tr connects the power supply from the power source to the power supply controlled circuit 3 when the switching MOS transistor Tr turns ON in response to the high level of the power supply control signal P. The key strobe signals T1 through Tj and Tj+i through Tm are subsequently developed from the power supply controlled circuit 3 to thereby be introduced into the OR gate circuits L1 through Lj and the AND gate circuits Lj+i through Lm, respectively.

The keyboard 4 can receive the key strobe signals T1 through Tj and Tj+i through Tm as output signals S1 through Sj and Sj+i through Sm generated from the OR gate circuits L1 through Lj and the AND gate circuits Lj+1 through Lm when the power supply control signal P bears the high level.

An actuation of a specified key included within the keyboard 4 provides a desired key output signal among key output signals K1 through Kn.

The keyboard output signals K1 through Kn are introduced into the power supply controlled circuit 3 to perform manipulation operations such as calculation functions and command instructions directed by the actuated keys.

The switching MOS transistor Tr turns OFF in response to the low level of the power supply control signal P to thereby terminate the power supply from the power source to the power supply controlled circuit 3. Therefore, the key strobe signals T1 through Tj and Tj+i through Tm become indefinite logic signal levels, respectively, namely, not definitely fixed at a level of "0" or "1".

When switching MOS transistor Tr is OFF (P at low level), all of the signals S1 through Sj bear the high levels since the inverted power supply signal $\bar{P}$ (now at high level) is introduced into the OR gate circuits L1 through Lj. On the other hand, the signals Sj+i through Sm hold all the low levels as the power supply control signal P (now at low level) is entered into the AND gate circuits Lj+i through Lm. In addition to the above, the power supply control circuit 2 receives the output signals of the OR gate circuit G which is responsive to the keyboard output signals K1 through ki.

Under these circumstances wherein the power supply from the power source to the power supply controlled circuit 3 is excluded, a selected key included within the keyboard 4 is actuated to initiate the power supply, the key selection being related to the combination of both the signal S1 and anyone of the key output signals K1 through Ki or the signal S2 and anyone of the key output signals K1 through Ki. In response to either one of the above combination output signals of the OR gate circuit G change to the high level, whereby the power supply control signal P is recovered to the high level to thereby provide the power supply from the power source to the power supply controlled circuit 3. The key output signals K1 through Kn are simultaneously introduced into the power supply controlled circuit 3 to provide numerical or command information corresponding to the respective key.

In contrast, the supply of power can not be initiated when the keys are actuated such that the signal Sj+1 is combined with the key input signals K1 through Ki or the signal Sj+2 is combined with the key output signals K1 through Ki, because the output signals of the OR gate circuit G can not be changed to the high level owing to the low levels of the output signals Sj+1 through Sm.

The AND gate circuits Lj+1 through Lm are required to hold the low level of the output signals Sj+1 through Sm without regard to the indefinite levels of the key strobe signals Tj+1 through Tm.

The termination of the power supply from the power source to the power supply controlled circuit 3 is achieved by allowing the power supply control signal P to achieve the low level in response to the actuation of a different power-off switch formed within the keyboard 4 or the lapse of a predetermined time after the actuation of any key included within the keyboard 4.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a keyboard equipped apparatus, said keyboard including a plurality of keys, said apparatus including a central processing unit for processing data introduced via said keyboard, a display for displaying the results of the processing of the data introduced via said keyboard, and a power source means for energizing said central processing unit, said central processing unit being precluded from receiving power energy from said power source means when said keyboard equipped apparatus is not utilized after a predetermined time period, the improvement comprising:

connecting means responsive to actuation of a selected one of said keys on said keyboard for connecting said central processing unit and said display to said power source means thereby supplying power from said power source means to said central processing unit in response to actuation of said one of said keys on said keyboard, said one of said keys also introducing a portion of said data for processing by said central processing unit upon actuation thereof, said connecting means including, means responsive to the absence of power energy supplied to said central processing unit from said power source means for generating control logic signals in response thereto, one of said control logic signals passing through said one of said keys on actuation thereof, means responsive to said control logic signals, to said power energy supplied from said power source means, and to actuation of said one of said keys on said keyboard for generating an enabling signal in response thereto, and switching means responsive to said enabling signal for connecting said power source means to said central processing unit, said control processing unit generating a plurality of strobe signals in response thereto, each of said strobe signals passing through said keys on said keyboard in response to each actuation thereof thereby uniquely identifying each of said keys on said keyboard.

2. In a keyboard equipped apparatus of claim 1 wherein said means for generating control logic signals comprising:

inverter means responsive to said means for generating an enabling signal for inverting said enabling signal, the inverter enabling signal being converted into said control logic signals for passing through said one of said keys on said keyboard in response to actuation thereof.

3. In a keyboard equipped apparatus of claim 2 further comprising:

a plurality of OR gate means, each responsive to one of said control logic signals for passing each of said control logic signals through each of said OR gate means in response to energization thereof, thereby generating a plurality of said control logic signals, said plurality of said control logic signals being applied to a plurality of keys on said keyboard via said OR gate means, each of said plurality of keys being capable of causing said connecting means to connect said central processing unit to said power source means in response to actuation thereof.

4. In a keyboard equipped apparatus of claim 3, wherein actuation of said selected one of said plurality of keys on said keyboard passes a particular one of said control logic signals to said means for generating an enabling signal; and wherein said means for generating an enabling signal comprises additional OR gate means responsive to said particular one of said control logic signals for passing said particular one of said control logic signals in response to energization thereof; and power supply controller means responsive to said particular one of said control logic signals passing through said additional OR gate means for generating said enabling signal.

5. In a keyboard equipped apparatus of claim 4 wherein said switching means comprises a transistor means, said transistor means connecting said central processing unit to said power source means in response to energization by said enabling signal generated by said power supply controller means.

* * * * *